June 2, 1959   E. F. MACKS   2,889,474
AIR SUPPORTED ROTOR
Filed March 4, 1957

INVENTOR.
ELMER FRED MACKS
BY *Pyle & Fisher*
ATTORNEYS

United States Patent Office 2,889,474
Patented June 2, 1959

2,889,474

AIR SUPPORTED ROTOR

Elmer Fred Macks, Vermillion, Ohio, assignor, by direct and mesne assignments, to Air-Glide, Inc., Cleveland, Ohio, a corporation Application March 4, 1957, Serial No. 643,666

9 Claims. (Cl. 310—90)

This invention pertains to dynamoelectric devices and more particularly to a dynamoelectric device in which the rotor and the stator are held in spaced relationship by a load carrying gas film.

In the copending application for patent Serial Number 558,676 filed January 12, 1956, under the title of Fluid Supported Rotor, now abandoned in favor of continuation-in-part application Serial Number 714,454, filed January 28, 1958, certain basic concepts have been disclosed with respect to dynamoelectric devices wherein a load carrying fluid film is utilized to support the relatively rotating rotor and stator. The present invention is directed to certain new and novel improvements of the device disclosed in the previously filed patent application and the present disclosure is a continuation-in-part of that application.

Other new and novel improvements of the referenced copending application for patent have been disclosed in additional copending applications. These additional applications are: Serial Number 577,828 filed April 12, 1956, under the title of Dynamoelectric Device With Fluid Supported Rotor, Serial Number 578,536 filed April 16, 1956, under the title of Fluid Dynamic Device, Serial Number 580,133 filed April 23, 1956, under the title of Fluid Supported Rotor, and Serial Number 583,820, now abandoned, filed May 9, 1956, under the title Dynamoelectric Device.

Another invention of Elmer Fred Macks, filed as a continuation in part with respect to this case, is presented in patent application Serial Number 700,651 filed December 4, 1957, under the title of "Dynamoelectric Device." The invention is primarily directed to a novel thrust limiting arrangement for a dynamoeyectric machine.

In the above referenced patent application dynamoelectric devices have been disclosed in which the rotor and the stator themselves have been formed to provide fluid dynamic load carrying film producing surfaces. It has been discovered that if an enlarged portion is provided on the rotor shaft to coact with a complemental surface provided on a sleeve carried by the stator, unusual results are obtained. Such a construction permits a fluid dynamic film to be built up between the magnetic field and the load to be supported. The result is a remarkable increase in cantilever load carrying capacity without meterially affecting the performance of the motor in any way.

Accordingly, one of the principal objects of the invention is to provide a new and novel dynamoelectric device in which a load carrying fluid dynamic film is developed between the magnetic field and the load to be driven or supported.

A further object of the invention is to provide a new and novel dynamoelectric device equipped with a single air bearing interposed between the magnetic field and the load to permit the relatively rotating parts to rotate about their center of mass as opposed to their geometric axis.

Another object of the invention is to provide a new and novel dynamoelectric device of simple and inexpensive construction and a device which at the same time has a long life and an increased efficiency.

An additional object of the invention is to provide a new and novel dynamoelectric device having the operating characteristics of those devices disclosed in the copending applications for patents, and at the same time a device in which the rotor and stator are constructed in one of the many well known techniques which provide a rotor and stator which cannot be machined to the smoothness required for dynamoelectric load-carrying film producing surfaces.

A further object of the invention is to provide a device in which a load carrying fluid film region is provided both in the magnetic field and extending from the magnetic field toward the load to be supported.

Still a further and more detailed object of the invention is to provide a device in accordance with the foregoing objective and which in addition has a load carrying fluid film producing region which is internal of the shaft and rotor to provide an inexpensive high load carrying, dirt free fluid film region.

Yet another object of the invention is to provide a device wherein the magnetic field is utilized to increase the cantilever load supporting characteristics.

Other objects and a fuller understanding of the invention may be had by referring to the following description and claims, taken in conjunction with the accompanying drawings, in which:

Figure 1:
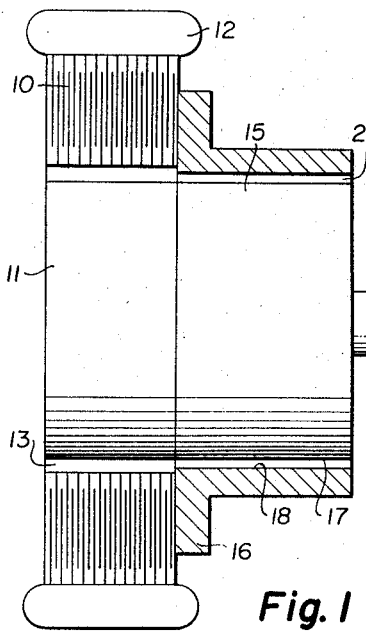
Figure 1 is a sectional view of an improved dynamoelectric device having a fluid film producing region between the magnetic field and the load supporting shaft end.

A stator element is shown at 10 in each of the drawings. A complemental rotor element 11 is also shown in each of the drawings. One of the elements carries windings for inducing a magnetic field in a core. In the drawings the windings are indicated at 12 and are carried by the stator 10. The disclosed core is of a conventional type being a plurality of sheets of magnetic material laminated together. In each of the drawings the numeral 10 which identifies the stator has a lead line which is directed to that portion of the stator which comprises the core. An air gap 13 is defined between the rotor 10 and the stator 11.

A shaft 14 is carried by the rotor. The shaft has an enlarged portion 15 which is immediately adjacent the rotor. In the disclosed embodiment of Figure 1 a bracket 16 is fixed to the stator 10. The enlarged portion 15 and the bracket 16 have smooth cylindrically contoured complemental surfaces 17 and 18. A hydrodynamic fluid film region 20 is defined by the surfaces 17, 18. Upon relative rotation of the rotor and stator, a load supporting film will be developed in the region 20. When the load carrying fluid film is a gas or pneumodynamic film, the enlarged portion or section 15 of the shaft 14 and the sleeve 16 are coaxial, the radial clearance of the region 20 will be from 0.000050 to 0.0005 inch per inch of diameter.

Figure 2:
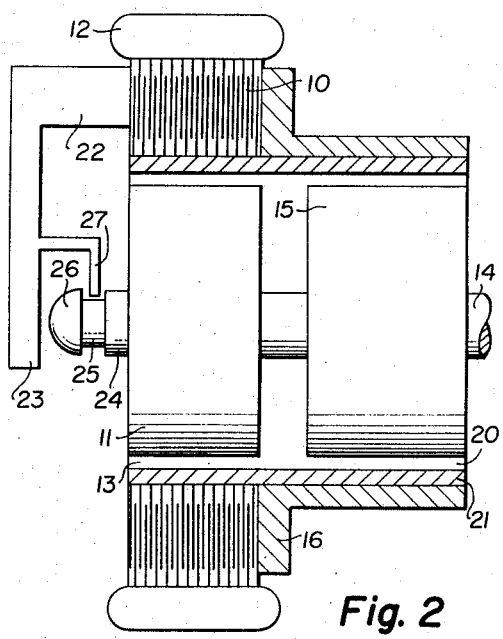
Figure 2 is a cross sectional view of a dynamoelectric device of slightly modified form wherein the fluid film region extends from the magnetic field outwardly to a location between the field and the load supporting end and wherein a stop mechanism is provided to limit relative axial movement of the rotor and stator.
Figure 4:
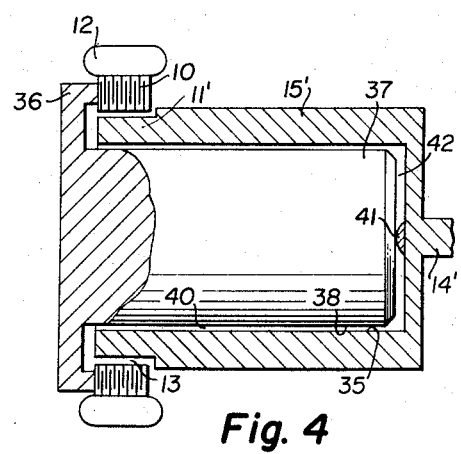
Figure 4 is a modified form of a dynamoelectric device wherein the fluid dynamic film is internal of the shaft.

The windings 12 induce a magnetic field. The magnetic field has a longitudinal dimension which is essentially the same as the longitudinal dimension of the stator 10 and the air gap 13. One of the outstanding advantages of the invention is achieved by interposing the load carrying fluid film producing region 20 between the magnetic field and load support end 19 of the shaft 14. In Figures 1, 2, and 4, the load support end 19 of the shaft 14 is, of course, the right hand end. The effect of so locating the fluid film region is that the weight of the rotor 11 tends to counter-balance the weight of the shaft 14 and the load.

Figure 5:
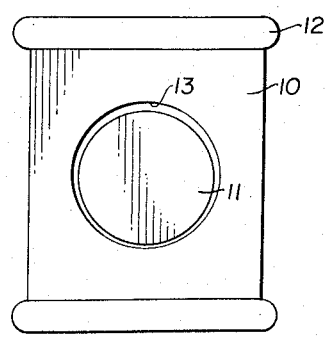
Figure 5 is an end elevational view of the device of Figure 1 wherein the rotor and stator are axially offset to increase the cantilever load carrying support of the device.

Outstanding results have been achieved by adding a further refinement which is most clearly disclosed in Figure 5. Reference to that figure will show that the axes of the rotor and the stator have been offset vertically. In other words, they have been offset in the direction of the load. The result is, that in the case of the embodiment of Figure 5, the lower magnetic field exerts a greater pull on the rotor 11 than does the upper field. This magnetic pull exerts a cantilever force which tends to pivot the rotor and shaft downwardly with regard to the left end of the device of Figure 1. The lower portion of the fluid film region 20 thus serves somewhat as a fulcrum with the load tending to pivot the rotor and shaft in one direction and the weight of the rotor and the pull of the magnetic field tending to pivot the rotor and shaft in the other direction.

In Figure 2 a sleeve 21 is carried by the bracket 16 and the stator 10. The sleeve 21 extends into and through the air gap 13. In Figure 2 the shaft enlarged section 15 and the rotor 11 are shown in spaced relationship. This has been done to make it clear that the rotor does not extend to the right of the magnetic field as seen in Figure 2. It is also done to extend, longitudinally speaking, the fluid film region 20. This longitudinal extending of the fluid film region increases the cantilever load support.

A stop bracket 22 is carried by the stator 10. The stop bracket 22 has an arm 23. A shaft extension 24 is carried by the rotor 11. The shaft extension has an annular groove 25 formed in it. The shaft extension 24 also has a rounded end 26 which coacts with the arm 23. An arm extension 27 is provided to extend into the groove 25. The coaction of these elements serves to limit relative axial movement of the rotor and the stator.

When the device is in operation the magnetic field tends to hold the rotor 11 in the field. When the device is first turned on, or more important when the device is turned off, the rotor may tend to shift axially from the region where the magnetic field is created. The inter-action of the bracket 22 and the shaft extension 24 limits this relative axial movement. It may also serve as a thrust bearing when the thrust load carried by the motor is more than the resistance to relative axial movement provided by the magnetic attraction of the field for the rotor.

Figure 3:
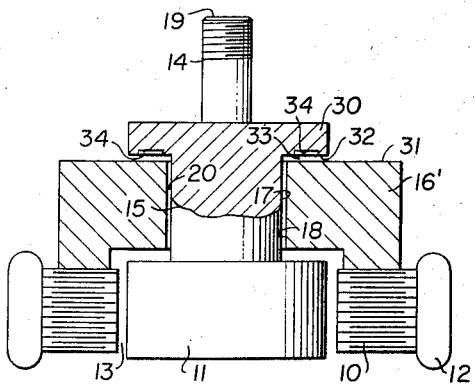
Figure 3 is a cross sectional view of a slightly modified form of the device of Figure 1 wherein the relative rotation is vertical and wherein a thrust washer is provided to develop a thrust load carrying fluid dynamic film.

In Figure 3 a dynamoelectric device is disclosed in which the relative rotation may be vertical. A thrust washer 30 is carried by the shaft 14. The thrust washer 30 and the bracket 16' have smooth complemental radial surfaces 31, 32. Upon relative rotation of the rotor and the stator a thrust load carrying fluid film will be developed in fluid region 33. A fluid film region 33 is defined by the surfaces 31, 32. Recesses 34 are formed in one of the surfaces 31, 32 (31 as disclosed) to aid in the generation of a load carrying film.

In Figure 4 a further modification of the device is disclosed. There the enlarged portion 15' and the rotor 11' are of tubular form. The rotor 11' and the shaft enlarged portion 15' have a smooth cylindrically contoured inner surface 35.

A bracket 36 is fixed to the stator 10. The bracket has an extension 37 which extends through the magnetic field and the air gap 13 to a location intermediate the magnetic field and the load supporting end 19 of the shaft 14. The projection 37 has a smooth cylindrically contoured external surface 38 which is complemental to the surface 35. The surfaces 35, 38 define a load carrying fluid film producing region 40.

The functioning of the device of Figure 4 is similar to the devices of Figure 1 and Figure 2. The construction of Figure 4 has certain advantages, however, for many applications. One of the outstanding advantages is that it is quite difficult for dirt to collect in the fluid film region 40. A further advantage is that the device is inexpensive and simple to manufacture.

A stop button 41 may be carried to the shaft 14. The stop button interacts within the surface 42 of the projection 37. It will be noted that the interaction of the stop 41 and the end surface 42 will limit relative axial movement in one direction. Such axial limitation will suffice where the load uniformly tends to cause relative movement of the rotor to the left as seen in Figure 4. A fan is a load of this type. It will be apparent that either the arm extension and groove 27, 25 or the lower portion of the arm 23 may be eliminated from the device of Figure 2 where the load will cause uniform relative movement of the rotor and stator. It will also be apparent that a second limit means may be included in the device of Figure 4.

The preceding description has disclosed an improved dynamoelectric device wherein a cantilever load supporting fluid film is developed between the magnetic field and the load to be driven and wherein the cantilever load support characteristics of the device are further improved by axial offset of the rotor and stator. The preceding description has also disclosed a device which is simple and inexpensive to manufacture, yet extremely rugged and having an exceptional long life.

Although the invention has been described in its preferred form with a certain degree of particularity, it is understood that the present disclosure of the preferred form has been made only by way of example and that numerous changes in the details of construction and the combination and arrangement of parts may be resorted to without departing from the spirit and the scope of the invention as hereinafter claimed.

I claim:

1. A fluid supported dynamoelectric device for cantilever load comprising, a stator, a rotor for relative rotation, a shaft having first and second ends, the first end being fixed to the rotor, the second end being for connection of a device to be driven, the shaft having a smooth cylindrically contoured portion formed between the ends, a bracket carried by the stator, the bracket having a smooth cylindrically contoured surface, the cylindrical surfaces defining a load carrying fluid film producing region therebetween, said rotor being totally supported radially when rotating by a film of fluid generated in said region by the coaction of the surfaces, the fluid in said film being supplied by the fluid ambient to the machine whereby to provide a device in which a rotor is totally carried on a film of fluid when the device is in operation.

2. A fluid supported dynamoelectric device for cantilever load comprising, a stator, a rotor for relative rotation, a shaft having first and second ends, the first end being fixed to the rotor, the second end being for connection of a device to be driven, the shaft having a smooth cylindrically contoured portion formed between the ends, a bracket carried by the stator, the bracket having a smooth cylindrically contoured surface, the cylindrical surfaces defining a load carrying fluid film producing region therebetween, said load carrying film being a gas film, and the radial clearance between said cylindrical surfaces being from about 0.000050 to about 0.0005 inch per inch of rotor surface diameter, said rotor being totally supported radially when rotating by a film of fluid generated in said region by the coaction of the surfaces, the fluid in said film being supplied by the fluid ambient to the machine whereby to provide a device in which a rotor is wholly carried on a film of fluid when the device is in operation.

3. A dynamoelectric device comprising, a rotor element, a stator element, one of the elements including a core wound to provide a magnetic field, and a sleeve carried by the stator, the sleeve having a smooth cylindrical surface, the rotor including a shaft having an end formed to transmit force to a work load, the rotor having a smooth cylindrical surface, the cylindrical surfaces having concentrically disposed portions intermediate the shaft work end and the magnetic field, said surface portions defining a pneumodynamic load carrying film producing region, and said rotor element when rotating being totally supported radially by a load carrying film of air generated in said region by the coaction of the surfaces, the air in said film being supplied by the atmosphere ambient to the machine.

4. A dynamoelectric device comprising, a rotor element, a stator element, one of the elements including a core wound to provide a magnetic field, and a sleeve carried by the stator, the sleeve having a smooth cylindrical surface, the rotor including a shaft having an end formed to transmit force to a work load, the rotor having a smooth cylindrical surface, the cylindrical surfaces being concentrically disposed, the surfaces defining a pneumodynamic load carrying film producing region extending from a location in the magnetic field to a location intermediate the magnetic field and the shaft work end, and said rotor element when rotating being totally supported radially by a load carrying film of air generated in said region by the coaction to the surfaces, the air in said film being supplied by the atmosphere ambient to the machine.

5. A dynamoelectric device comprising, a rotor element, a stator element, one of the elements including a core wound to provide a magnetic field, and a sleeve carried by the stator, the sleeve having a smooth cylindrical surface, the rotor including a shaft having an end formed to transmit force to a work load, the rotor having a smooth cylindrical surface, the cylindrical surfaces having concentrically disposed portions intermediate the shaft work end and the magnetic field, said surface portions defining a pneumodynamic load carrying film producing region, said rotor being totally supported radially when rotating by a film of fluid generated in said region by the coaction of the surfaces, and the stator having an aperture therein, the axis of the cylindrical surfaces being offset in the direction of work load application from the axis of the aperture, the film produced in said region when the device is in operation being a fulcrum for the opposing work load force and the force caused by the axis offset, the fluid in said film being supplied by the fluid ambient to the machine, whereby to provide a dynamoelectric device adapted to carry a cantilever load in which the magnetic field and the work load form opposing forces tending to pivot the rotor about a fulcrum formed by the load carrying film.

6. A dynamoelectric device comprising, a rotor element, a stator element, one of the elements including a core wound to provide a magnetic field, a sleeve carried by the stator, the sleeve having a smooth cylindrical surface, the rotor including a shaft having an end formed to transmit force to a work load, the rotor having a smooth cylindrical surface, the cylindrical surfaces having concentrically disposed portions intermediate the shaft work end and the magnetic field, said surface portions defining a pneumodynamic load carrying, film producing region, said rotor element when rotating being totally supported radially when rotating by a film of air generated in said region by the coaction of the surfaces, the air in said film being supplied by the atmosphere ambient to the machine, and stop means to limit relative axial movement of the rotor and the stator.

7. A dynamoelectric device comprising, a rotor element, a stator element, one of the elements including a core wound to provide a magnetic field, and a sleeve carried by the stator, the sleeve having a smooth cylindrical surface, the rotor including a shaft having an end formed to transmit force to a work load, the rotor having a smooth cylindrical surface, the cylindrical surfaces having concentrically disposed portions intermediate the shaft work end and the magnetic field, said surface portions defining a pneumodynamic load carrying film producing region, said sleeve and said rotor each having a smooth radially extending surface substantially normal to the cylindrical surfaces, the radial surfaces defining a second load carrying fluid film producing region therebetween, said radial surfaces forming a fluid thrust bearing for said rotor and stator to limit relative axial movement of the elements, and said rotor element when rotating being totally supported radially by a load carrying film of air generated in said region by the coaction of the surfaces, the air in said film being supplied by the atmosphere ambient to the machine.

8. A dynamoelectric device comprising, a stator having an aperture therein, a bracket carried by the stator, a sleeve carried in the bracket and having a smooth cylindrical inner surface defining a bore therethrough, and a rotor carried in the stator aperture and having a shaft portion projecting through the sleeve bore, the shaft portion having a cylindrically contoured section, the section being concentric with the sleeve surface, the section and the surface defining a fluid load carrying film producing region therebetween for the creation of a rotor supporting film of fluid when the device is in operation, said rotor being totally supported radially when rotating by a film of fluid generated in said region by the coaction of the surfaces, the fluid in said film being supplied by the fluid ambient to the machine.

9. A dynamoelectric device comprising, a rotor element, a stator element, one of the elements being wound to provide a magnetic field, and the stator having first and second sides, the stator having an aperture therein disposed through the magnetic field, the stator having an elongated projection, the projection having a cylindrically contoured outer surface, the projection being supported cantilever fashion at said first side, the projection being disposed through said aperture and extending past said second side, the rotor being tubular and having a smooth cylindrically contoured inner surface, the rotor being telescoped over the stator projection, said surfaces defining a load carrying fluid film producing region therebetween said rotor being totally supported radially when rotating by a film of fluid generated in said region by the coaction of the surfaces, the fluid in said film being supplied by the fluid ambient to the machine.

References Cited in the file of this patent
FOREIGN PATENTS 129,404   Sweden _____ Sept. 12, 1950